Inventors
RENE L. F. CHAZAL,
ROGER G. L. GULLING
By STEVENS, DAVIS, MILLER & MOSHER
Attorneys United States Patent Office 3,495,299
Patented Feb. 17, 1970

3,495,299
APPARATUS FOR THE CONTINUOUS FILTRATION OF MOLTEN PLASTICS MATERIAL
René Louis Fernand Chazal, Lyon, Rhone, and Roger Georges Louis Gulling, Saint-Fons, Rhone, France, assignors to Rhone-Poulenc S.A., Paris, France, a French body corporate
Continuation-in-part of application Ser. No. 445,939, Apr. 6, 1965. This application Oct. 10, 1967, Ser. No. 674,303
Claims priority, application France, Apr. 8, 1964, 970,139
Int. Cl. B29f 3/02
U.S. Cl. 18—12    3 Claims

ABSTRACT OF THE DISCLOSURE

The specification describes filtering apparatus for use in an extrusion apparatus for plastics material, the apparatus being placed between the extrusion screw and the extrusion nozzle. The apparatus includes a sleeve of filtering material, e.g. sintered metal located in a casing in which rotates an agitator within the sleeve, the agitator being in close proximity to the sleeve and to the end wall of the casing, the end wall having a duct for removing impurities which do not pass through the filter.

CROSS-REFERENCE TO RELATED APPLICATION

This application is a continuation in part to our copending application No. 445,939, filed Apr. 6, 1965, now abandoned.

In the extrusion art as at present applied to plastic materials, it is known to dispose in the path of the molten material filters intended to collect the infusible foreign particles and to perfect the dispersion of the component elements (polymer, pigments, dyestuffs, stabilizers, sliding agents, etc.) of the composition.

These filter members, which are normally disposed between the end of the screw and the nozzle, may have various forms, depending upon the severity of the filtration aimed at the filtered materials and the required rates of flow.

The most usual forms of construction of such devices are:

(1) A flat filter bed composed of two plates formed with multiple holes and enclosing one or more thicknesses of fine metallic grids.

This device has the disadvantages of a small surface, rapid clogging and high loss of pressure.

In order to obviate these disadvantages, this type of filter has been improved by adapting it to be readily and rapidly removed and replaced by a fresh filter. Nevertheless, the frequency with which these filter-changing operations are carried out makes its use laborious and unreliable, for example in the case of the extrusion of profiled articles requiring delicate adjustment of the extrusion rate.

(2) Filter beds of various forms for affording a larger filtering surface. These filters may take the form of a cone or a cylinder of variable length, the material arriving through the inside or the outside of the filter.

Their advantages, at least in principle, reside in a larger filtering surface, which results in a reduction of the pressure loss and an increase in the time for which they can be used before they become clogged.

The disadvantages of these devices include mechanical constructional difficulties, difficulties in rapidly replacing the clogged filter and above all increase of the risks of the creation of dead spaces in which the material is neither moved or renewed. The latter disadvantage results, on the one hand, in dangers of thermal decomposition and on the other hand renders illusory, to a large extent, the hoped-for gain in the effective filtering surface.

Thus, in the case of a filter having a cylindrical filtering surface, it has been found that the increase in the length of the filtering cylinder, which amounts to twice the original value, has resulted only in the momentary rate of flow being increased by 8% instead of by 100% as would be expected. Moreover, the increase in the counter-pressure due to the filter has been low (10% less).

Finally, it has been found that, while the time for which the filter can be used before it becomes clogged is lengthened, the pressure required to cause the material to pass through the filtering wall increases with time.

According to the present invention there is provided in an extrusion apparatus for the continuous filtration of molten plastic material and the simultaneous removal of impurities therefrom disposed between said extrusion screw and said extrusion nozzle, said filtration apparatus comprising an external casing having an interior chamber, an annular filter of porous material disposed within said interior chamber, a rotatable agitator disposed within said filter and in close proximity with the internal surface of said filter, means adjacent one end of said casing for introducing plastic material to be filtered between said agitator and the internal surface of said filter, an end wall provided at the other end of said casing, said agitator being essentially coextensive in length with said filter and having an axial end surface positioned in close proximity to said end wall, a discharge channel connected to said chamber for discharging filtered plastic material which has passed through said filter to said extrusion nozzle, and a duct provided in said end wall for discharging impurities from within said filter.

This device makes it possible to overcome the following two disadvantages:

(a) Apparent increase of the viscosity of plastic masses in pasty fusion owing to their lack of agitation in the neighbourhood of the filtering surfaces.

(b) Increases of the pressure necessary for the filtration in the course of operation and gradual clogging of the filtering surfaces.

In a preferred form the filter is cylindrical or slightly frusto-conical in form and the agitator is arranged within the filter.

Preferably, the agitator is provided with a helically disposed element or elements for example in the form of a screw-thread.

The plastic material in the state of pasty fusion is brought to one end of the apparatus and taken up by the screw, which imparts thereto, simultaneously, an advancing movement from the inlet end into the filter cylinder at the other end, and a pressure against the inside surface of the said filter for the purpose of promoting its passage through the latter.

Moreover, owing to the movement of the screw, any foreign bodies which are likely to clog the filter by becoming attached to its surface are gradually forced towards that end of the cylinder which is opposite to the inlet end.

At this opposite end, there is situated an adjustable aperture through which there can be continuously or discontinuously extracted a fraction of the plastic material employed, in which fraction the undesirable foreign particles are contained.

In order that the present invention may more readily be understood, the following description is given, merely by way of example, with reference to the accompanying drawings in which.

Figure 1:
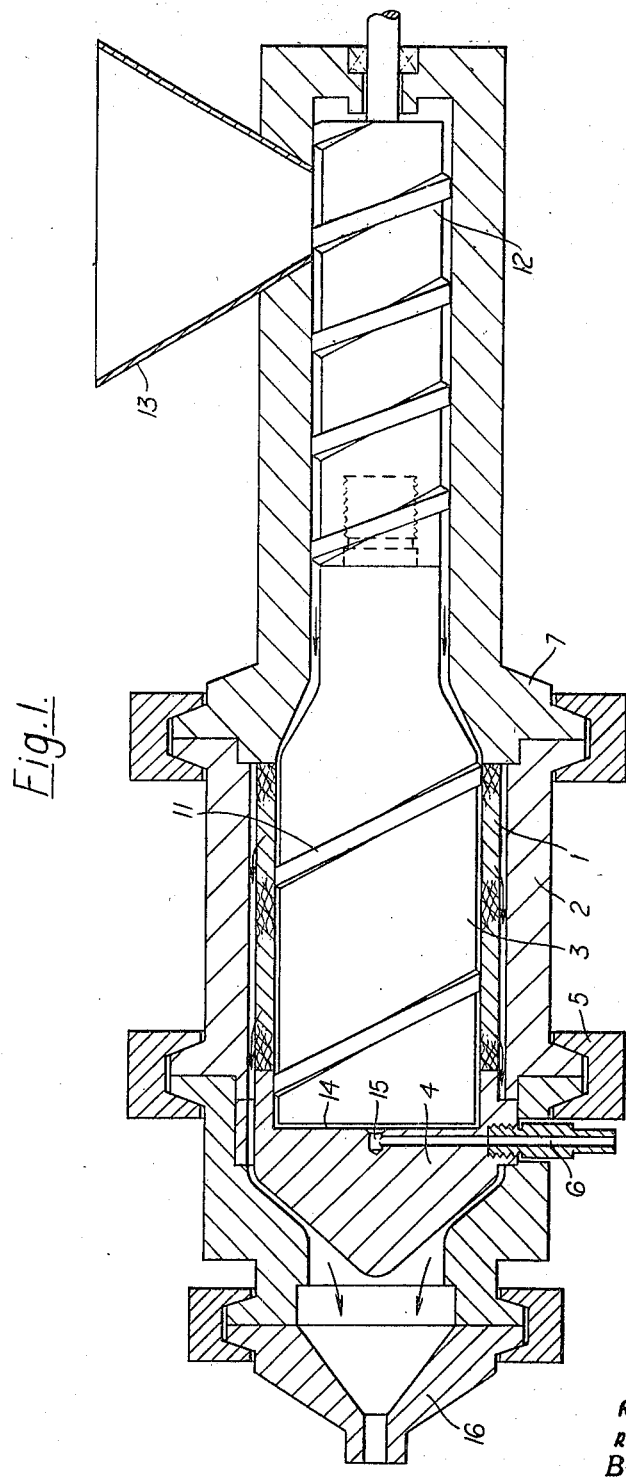
FIGURE 1 is a cross-section through one embodiment of apparatus according to the invention.

Referring now to FIGURE 1 the apparatus illustrated comprises a porous cylindrical filter sleeve 1 of sintered metal, mounted within a cylindrical filter casing which is provided with longitudinally extending internal ribs on which the filter sleeve 1 bears. This sleeve is constructed to have a length of 90 mm., an internal diameter of 60 mm., an inside surface area of 1.7 dm.$^2$, a wall thickness of 5 mm. and a mean pore diameter of 75$\mu$.

Mounted within the sleeve 1 is a rotatable agitator 3 essentially coextensive in length with the sleeve 1 and comprising a shaft having a diameter of 56 mm., and a helical rib 11 having a pitch of 60 mm., and an outside diameter of 59 mm., which is thus in close proximity to the internal surface of the filter sleeve 1. An end member 4 bears against the end of porous cylinder 1 and is held in place by an outlet union 8 which is retained on the casing 2 by a collar 5.

A discharge channel 6 leads from an aperture 15 at the centre of the inner end wall 14 of the end member 4 and an inlet union 7 is secured to the opposite end of the sleeve 1 and casing 2 to the end member 4. The end surface of the agitator 3 is in close proximity to the end wall 14.

Figure 2:
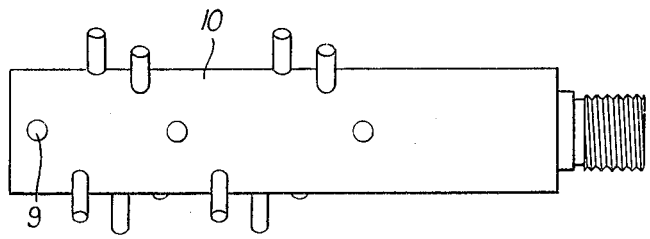
FIGURE 2 is a side elevation of an alternative form of agitator.
Figure 3:
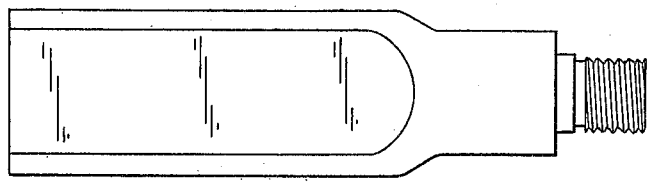
FIGURE 3 is a side elevation of a further form of agitator.

The agitator 3 may be replaced by one comprising a shaft 10 with helically mounted elements 9 as shown in FIGURE 2. A further construction is shown in FIGURE 3 in which the agitator is of generally square cross-section but is provided with rounded corners.

In use of the apparatus of FIGURE 1 material, delivered by an extruder 12, having feed hopper 13 and connected to the inlet union, is taken up by the agitator 3 which is driven by the screw of the extruder and which distributes the material along the inner wall of the filter sleeve 1 and maintains it in movement. Foreign bodies extracted by the filter sleeve and tending to clog the latter are gradually forced towards the end wall 14 of the apparatus and are discharged through aperture 15 in the end wall and through the channel 6. The plastics material itself passes through the filter sleeve 1 and is directed between the sleeve and the casing 2 to pass out through the discharge union 8 and so to extrusion nozzle 16 connected thereto.

EXAMPLE 1

By means of such apparatus mounted on an extruder having a diameter of 40 mm., and having an $L/D$ ratio of 20, where L is the length and D the diameter of the extruder, a plasticised composition based upon cellulose acetate was passed at rate varying in accordance with the speed of the extruder screw, up to 13 kg. per hour, with a pressure of 120 kg./cm.$^2$ upstream of the filter.

A similar device with the same filter, but without any internal agitation, gave only 75% of the aforesaid rates of flow, at the various speeds of the extruder screw, despite the fact that the pressure upstream of the filter was raised to 280 kg./cm.$^2$.

The effectiveness of the draining at the end of the filter is shown in the following example:

EXAMPLE 2

The same operation as that described in the first example was attempted with a similar plastic mass, but charged with fine aluminium grains.

It was found possible to collect all the aluminium grains which would normally have remained on the filter and would have rapidly clogged it, by means of the draining provided for this purpose, while the filtered material left the device normally, having been completely freed from the aluminium particles.

The increase in the filtration speed per unit surface of the filter is further illustrated by the following example:

EXAMPLE 3

In an extruder having a diameter of 90 mm., wherein the ratio $L/D$ is 15, where L is the length and D the diameter of the extruder, which is equipped with a porous cylindrical metal filter, having no internal agitation, surface of the filter 16 dm.$^2$, internal diameter 120 mm., 5 mm. thick, mean diameter of the pores 50$\mu$, a pressure upstream of the filter of 350 kg./cm.$^2$, was noted with a rate of flow of 40 kg. per hour of polyvinyl butyral.

The same performances (rate of flow of 40 kg. per hour with a pressure of 350 kg./cm.$^2$) are obtained with a cylindrical porous metal filter having the same thickness and the same porosity, but a surface reduced to 1.7 dm.$^2$, and provided with an internal stirring device.

The use of a filter of cylindrical form as in the preceding examples has not, in fact, any limiting character. Of course, filters of other forms may be employed which comprises a stirring device very close to the filtering surface and a device for discharging to the outside the impurities collected on the filter.

We claim:

1. In an extrusion apparatus for molten plastics material having an extruder including a single rotatable extrusion screw, an extrusion nozzle and means for filtering the molten plastics material, the improvement consisting in a continuous filtration apparatus inserted between the end of said extrusion screw and said extrusion nozzle, said continuous filtration apparatus comprising, in combination:
    (a) a cylindrical outer casing of a thickness to withstand the extrusion pressure of said extrusion screw;
    (b) means to secure said outer casing to said extruder;
    (c) means to secure said outer casing to said extrusion nozzle;
    (d) a substantially cylindrical filtering element disposed concentrically within said cylindrical outer casing and spaced therefrom to define an annular space therewith;
    (e) annular passage means in said means to secure said outer casing to said extrusion nozzle, effective to provide communication between said annular space and said extrusion nozzle;
    (f) an internal surface to said filtering element;
    (g) an end wall at the end of said casing remote from said extrusion screw, said filtering element abutting said end wall effective to be closed thereby;
    (h) a single axially extending elongate member within said filtering element and connected to said extrusion screw for rotation therewith;
    (i) an external surface to said elongate member positioned in close proximity and parallel to said internal surface;
    (j) an aperture in said end wall within said filtering element; and
    (k) a duct connected to said aperture for discharging impurities from within said filtering element.

2. Apparatus as claimed in claim 1, in which the elongate member is substantially cylindrical and is provided with helically disposed elements extending near said internal surface of said filtering element.

3. Apparatus as claimed in claim 2 in which said helically disposed element consists of a helical rib.

References Cited

UNITED STATES PATENTS

| | | | |
|---|---|---|---|
| 508,958 | 11/1893 | Middleton | 100—110 |
| 840,298 | 1/1907 | Carlson. | |
| 2,360,984 | 10/1944 | Schmitz | 100—110 XR |
| 2,458,068 | 1/1949 | Fuller | 100—104 |
| 3,093,579 | 6/1963 | Schmidt | 210—117 |
| 3,230,865 | 1/1966 | Hibbel et al. | 100—37 |
| 3,360,820 | 1/1968 | Zitzmann et al. | 18—12 |

WILLIAM J. STEPHENSON, Primary Examiner

U.S. Cl. X.R.

18—8; 100—104